United States Patent
Kim et al.

(10) Patent No.: US 6,972,920 B2
(45) Date of Patent: Dec. 6, 2005

(54) METHOD AND APPARATUS FOR PREVENTING ADJACENT TRACK ERASE IN HDD

(75) Inventors: Dae-il Kim, Incheon Metropolitan (KR); Jae Myung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 10/664,967

(22) Filed: Sep. 22, 2003

(65) Prior Publication Data

US 2004/0075931 A1   Apr. 22, 2004

(30) Foreign Application Priority Data

Sep. 19, 2002   (KR) ............ 10-2002-0057325

(51) Int. Cl.[7] .............................. G11B 21/02
(52) U.S. Cl. ....................... 360/75; 360/67
(58) Field of Search .................. 360/60, 61, 63, 360/67, 68, 46, 97.02, 75

(56) References Cited

U.S. PATENT DOCUMENTS 6,405,277 B1 * 6/2002 Jen et al. ................. 711/4
6,496,317 B2 * 12/2002 Lacombe .................. 360/68

FOREIGN PATENT DOCUMENTS

| JP | 63167404 A | * 7/1988 | ............ G11B 05/09 |
| JP | 05258215 A | * 10/1993 | ............ G11B 05/09 |
| JP | 5-334606 | 12/1993 | |

* cited by examiner

Primary Examiner—David Hudspeth
Assistant Examiner—Jason Olson
(74) Attorney, Agent, or Firm—Staas & Halsey LLP

(57) ABSTRACT

A method and apparatus for preventing an adjacent track erase effect due to a magnetic head. In the method, a write command is received, an ambient temperature of a hard disc drive is measured, and whether the ambient temperature exceeds a threshold temperature is determined. If the ambient temperature exceeds the threshold temperature, the intensity of a write current is adjusted according to the position of a magnetic head on the hard disc drive. If an overshooting value of the write current exceeds a predetermined steady-state value, the overshooting value of the write current is adjusted. Applying the write current having the intensity and the overshooting value adjusted to the magnetic head. An algorithm having writing intervals can also be used in a hard disc drive. Thus, a writing field can be minimized and made suitable for variations in the temperature of the hard disc drive and coercivity of a magnetic disc so that an adjacent track erase effect can be reduced. Also, since a thermal pole tip protrusion effect due to a several-times-repeated writing operations can be prevented, a margin of a bit error rate of a magnetic head/magnetic disc can be increased and defects occurring on the magnetic head and the magnetic disc can be minimized.

12 Claims, 5 Drawing Sheets

METHOD AND APPARATUS FOR PREVENTING ADJACENT TRACK ERASE IN HDD

CROSS-REFERENCE TO RELATED APPLICATIONS

This application claims the priority of Korean Patent Application No. 2002-57325, filed Sep. 19, 2002, in the Korean Intellectual Property Office, the disclosure of which is incorporated herein in its entirety by reference.

BACKGROUND OF THE INVENTION

1. Field of the Invention

The present invention relates to a data storing system, and more particularly, to a method of preventing an adjacent track erase effect by performing a writing operation at regular intervals in a hard disc drive and an apparatus for controlling the hard disc drive.

2. Description of the Related Art

FIG. 1 is a flowchart explaining a method of preventing an adjacent track erase effect according to the prior art.

To reduce an adjacent track erase (ATE) effect in a hard disc drive (HDD), a write current is generally controlled at every data zone and at every temperature through an adaptive read channel optimization (ARCO). During the manufacturing process of HDDs, heads on which an ATE effect occurs are screened out through several hundreds or thousands of side writings. In general, when manufacturing HDDs, a servo writing, a function test, a burn-in test, and the like are performed. During the servo writing, position information is written on a disc, and during the function test, whether a maintenance cylinder has a defect and whether reading/writing can be performed in a data zone are determined. Also, during the burn-in test, whether a defect occurs in the data zone is determined. The burn-in test also includes a process of optimizing a read channel of a HDD. The optimization process is performed by a controller of the HDD.

In a conventional method of controlling an ATE effect, in operation 310, a host computer receives a write command. Thereafter, a controller of a HDD determines whether T a temperature sensor has sensed a temperature T higher than a threshold temperature $T_{th}$ as shown in operation 320. Here, a temperature at which a writing capability starts degrading is determined due to the shrinkage rate of a head pole tip and the coercivity of a recording medium.

If in operation 320, the temperature T is lower than the threshold temperature $T_{th}$, the process terminates without compensating for an ATE effect.

On the other hand, if in operation 320, the temperature T is higher than the threshold temperature $T_{th}$, in operation 330, the position of the magnetic head on an area of a data zone is determined. If the head is positioned in a middle disc (MD) zone, only an ATE effect due to a temperature is compensated by adjusting the intensity or overshooting of a write current by slightly lowering them. If the head is positioned in an inner disc zone or outer disc zone, an ATE effect due to the data zone in which the head is positioned in and an ATE effect due to the temperature are compensated greatly reducing the intensity or overshooting of the write current, as shown in operation 340.

As described above, even though a read channel control (RCO) for controlling the intensity or overshooting of the write current is performed depending on a variation in the temperature, an ATE effect cannot be locally/wholly avoided due to an increase in the number of writings performed.

Also, the ATE effect cannot be completely avoided in a manufacturing process of an HDD. Thousands of writings on the magnetic disc affect the sensitivity of the magnetic disc, causing an abnormal operation of the magnetic disc. If thermal pole tip protrusion due to heat generated by the coil is severe during a writing operation, a writing failure rate of the head may increase. Also, thermal pole tip protrusion may cause local writing failure or scratches. In other words, minor problems may occur. Write pole overheating affects a reproducing head, which may cause a reproducing error or may affect the life span of the reproducing head.

SUMMARY OF THE INVENTION

According to an aspect of the present invention there is provided a method of preventing an ATE effect by applying a write current to a magnetic head at regular intervals and an apparatus for controlling an HDD.

According to an aspect of the present invention there is provided a computer-readable recording medium on which a program for executing the method in a computer is written.

According to an aspect of the present invention, there is provided a method of preventing an adjacent track erase effect due to a magnetic head. A write command is received, an ambient temperature of a hard disc drive is measured, and whether the ambient temperature exceeds a threshold temperature is determined. If the ambient temperature exceeds the threshold temperature, the intensity of a write current is adjusted according to the position of the magnetic head on the hard disc drive. If an overshooting value of the write current exceeds a predetermined steady-state value, the overshooting value of the write current is adjusted. Applying the write current having the adjusted intensity and overshooting value to the magnetic head.

According to another aspect of the present invention, there is also provided a controlling apparatus of a hard disc drive for preventing an adjacent track erase effect. The controlling apparatus includes a temperature sensor, a controller, and a write driver. The temperature sensor receives a write command and measures an ambient temperature of a hard disc drive. The controller controls intensity of a write current and an overshooting value of the write current depending on the ambient temperature of the hard disc drive and the position of the magnetic head. The write driver supplies the write current having the adjusted intensity and overshooting value to the magnetic head.

BRIEF DESCRIPTION OF THE DRAWINGS

These and/or other aspects and advantages of the invention will become apparent and more readily appreciated from the following description of the aspects of the present invention, taken in conjunction with the accompanying drawings of which.

DETAILED DESCRIPTION OF THE PREFERRED EMBODIMENTS

Figure 1:
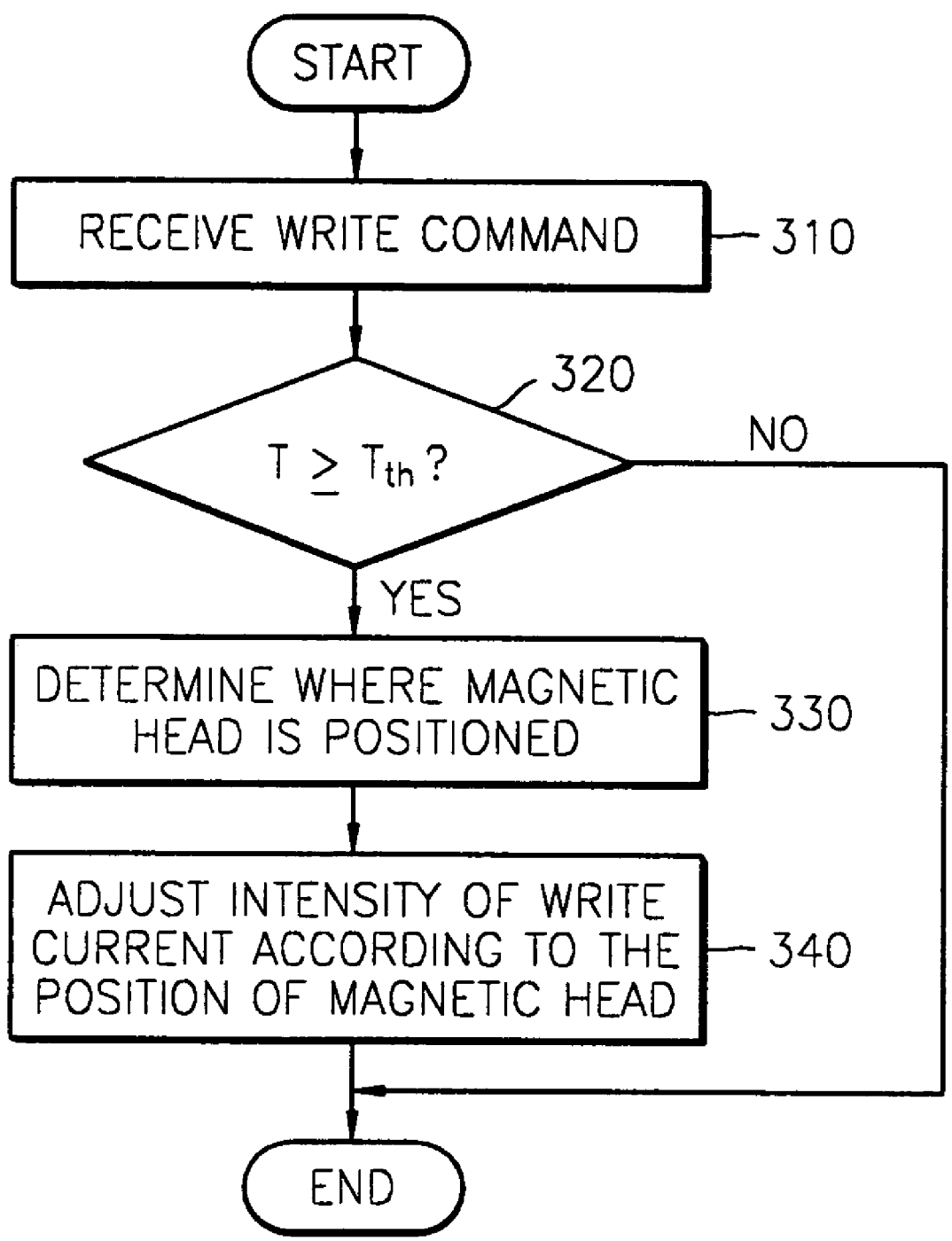
FIG. 1 is a flowchart explaining a method of preventing an adjacent track erase effect according to the prior art.

Reference will now be made in detail to the aspects of the present invention, examples of which are illustrated in the accompanying drawings, wherein like reference numerals refer to like elements throughout. The aspects are described below in order to explain the present invention by referring to the figures.

Figure 2:
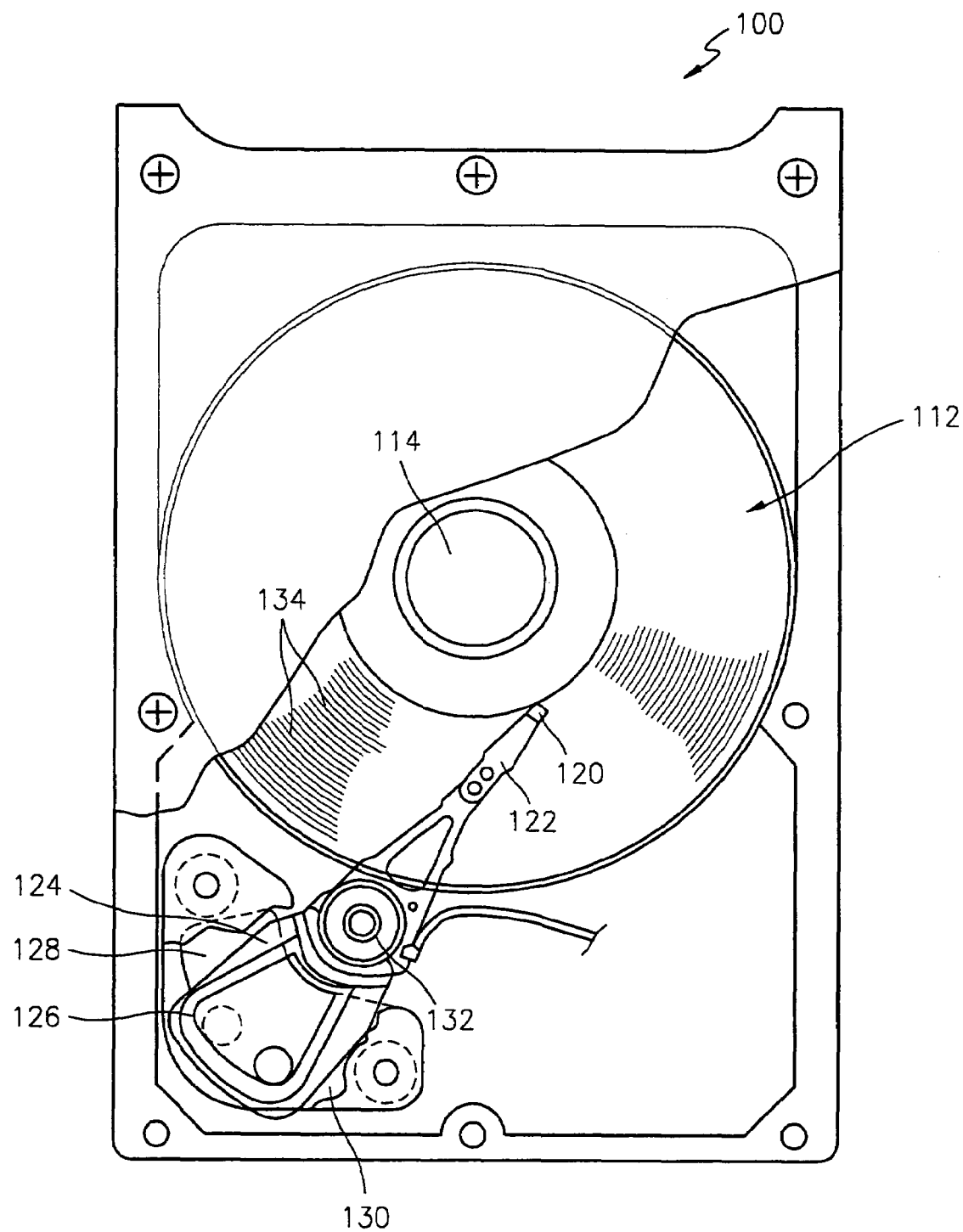
FIG. 2 is a view of a hard disc drive according to an aspect of the present invention.

FIG. 2 is a view of an HDD according to an embodiment of the present invention. Referring to FIG. 2, an HDD 100 includes at least one disc 112 that is spun by a spindle motor 114. The HDD 100 further includes a transducer (not shown) positioned near to the surface of the disc 112.

The transducer senses a magnetic field formed on the surface of the disc 112 or magnetizes the surface of the disc 112 to read or write data from or onto the spinning disc 112. Though one transducer is described herein, it should be understood that the above transducer is comprised of a writing transducer that magnetizes the disc 112 and a reading transducer that senses the magnetic field of the disc 112.

The transducer may be integrated into a magnetic head 120. The magnetic head 120 has a structure in which an air bearing is created between the transducer and the surface of the disc 112. The magnetic head 120 is combined with a head stack assembly (HSA) 122. The HSA 122 is attached to an actuator arm 124 having a voice coil 126. The voice coil 126 is close to a magnetic assembly 128 that defines (supports) a voice coil motor (VCM) 130. Current applied to the voice coil 126 generates torque that causes the actuator arm 124 to rotate around a bearing assembly 132. The rotation of the actuator arm 124 may allow the transducer to move across the surface of the disc 112.

Data is stored in annular tracks of the disc 112. The disc 112 generally has a data zone in which user data is written, a parking zone in which a head is positioned when the HDD 100 is not used, and a maintenance cylinder. As shown in FIG. 2, each of tracks 134 has a plurality of sectors. Each of the sectors includes a data sector having a data field and an identification (ID) field and a servo sector containing servo data. An inter sector gap (ISG) exists between every two data sectors. Digital data is written in the data field and the ID field contains data necessary for identifying sectors and tracks (cylinders). Servo data written in the servo sector includes a preamble, a servo address mark (SAM), a gray code, a burst, and a pad. The preamble provides a clock signal synchronization when the servo data is read and forms a gap, before the servo sector, to indicate the servo sector and is also referred to as servo sync. The SAM informs the start of a servo to provide synchronization for reading the gray code, and marks a data point at which timing pulses related to a servo control are generated. The gray code assigns a track number to each of the tracks. The burst provides a position error signal (PES) necessary for seeking and following a track. The pad provides a margin of the transition from the servo sector to the data sector. The transducer moves across the surface of the disc 112 reading or writing data from or onto another track.

Figure 3:
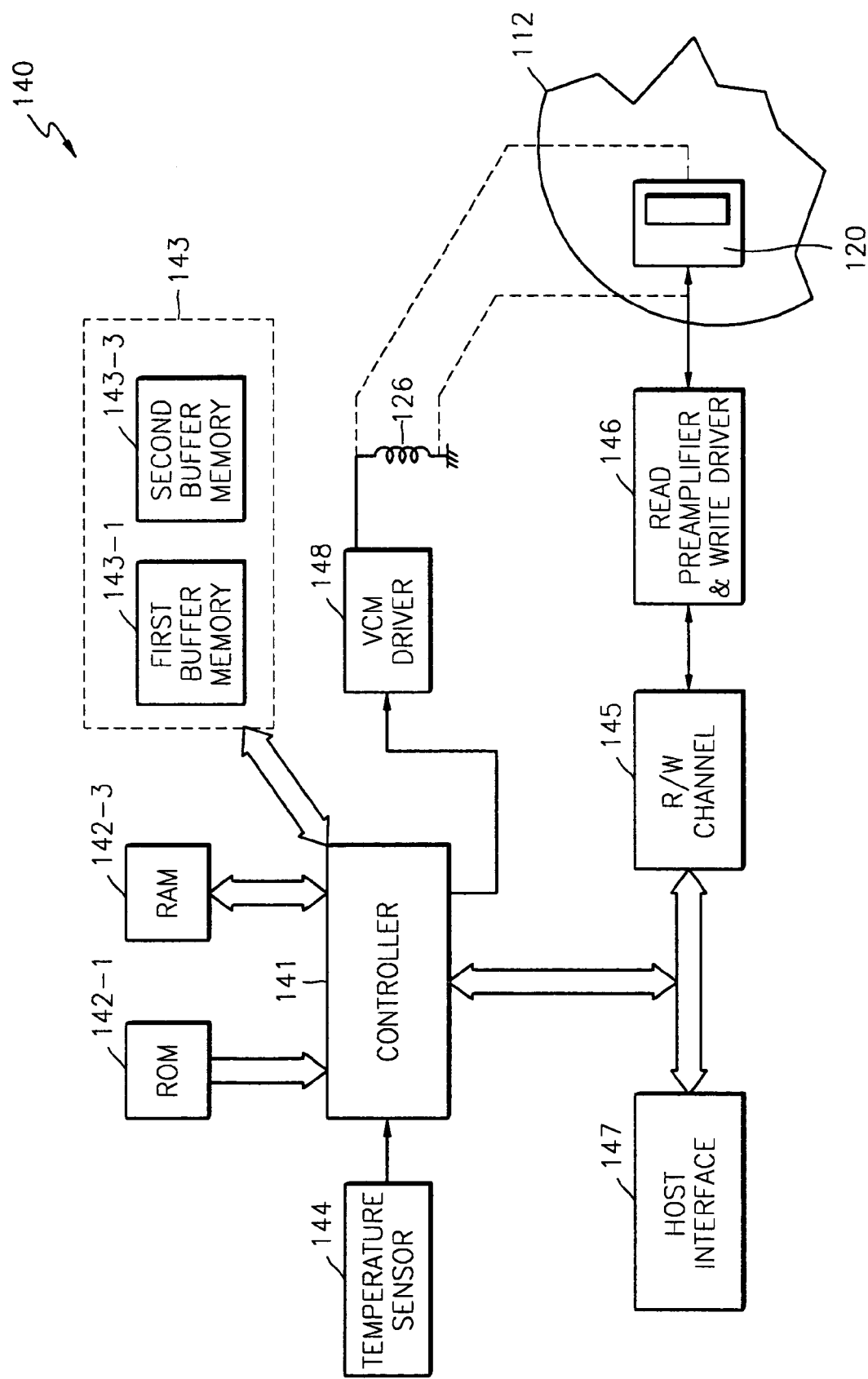
FIG. 3 is a block diagram of a controlling apparatus for controlling a hard disc drive according to an aspect of the present invention.

FIG. 3 is a block diagram of a controlling apparatus for controlling an HDD according to an aspect of the present invention. Referring to FIG. 3, a controlling apparatus 140 includes a controller 141 connected to a magnetic head 120 via a read/write (R/W) channel 145 and a read preamplifier & write driver 146. The controller 141 may be a digital signal processor (DSP), a microprocessor, a microcontroller, or the like. The controller 141 provides a control signal to the R/W channel 145 to read or write data from or onto the disc 112. If a temperature sensor 144 senses a temperature less than a threshold temperature, the controller 141 determines the position of the magnetic head 120 in a data zone of the disc 112, adjusts the intensity of a write current in a steady-state or overshooting of the write current in a transient state, and controls the magnetic head so that data is written onto the disc 112 at regular intervals. Data is generally transmitted from the R/W channel 145 to a host interface 147. The host interface 147 interfaces a HDD with a host such as a personal computer.

In a read mode, the R/W channel 145 converts an analog signal, read from the magnetic head 120 and amplified by the read preamplifier 146, into a digital signal that a host computer (not shown) can read, and sends the digital signal to the host interface 147. Also, the R/W channel 145 receives user data from the host computer via the host interface 147, converts user data into a write current so as to write user data on the disc 112, and sends the write current to the write driver 146.

The controller 141 is connected to a VCM driver 148 that supplies a drive current to the voice coil 126. The controller 141 supplies the control signal to the VCM driver 148 to control the excitation of the VCM 130 and the movement of the transducer.

The controller 141 is connected to a read only memory (ROM) 142-1 or a flash memory, which is a non-volatile memory, and a random access memory (RAM) 142-3. The ROM 142-1 and the RAM 142-3 contain commands and data the controller 141 uses to execute a software routine.

The software routine includes a seek routine to transfer the transducer from one track to another track and a following routine to find a target sector in a track. The seek routine includes a servo control routine to guarantee the exact movement of the transducer to a target track.

The ROM 142-1 and the RAM 142-3 store programs for adjusting the intensity and overshooting of the write current according to the sensed temperature, and a threshold temperature value. Thus, if the temperature sensor 144 senses a temperature lower than the threshold temperature while power is supplied, the controller 141 determines the position of the magnetic head 120 to adjust a steady-state value and a transient value of the write current. Here, a temperature at which a writing capability starts degrading is determined due to the shrinkage rate of a head pole tip and the coercivity of a recording medium. A buffer memory 143 receives a write command from the host computer and stores data to be written in a first buffer memory 143-1. A second buffer memory 143-3 temporarily stores data read from the disc 112.

Figure 4:
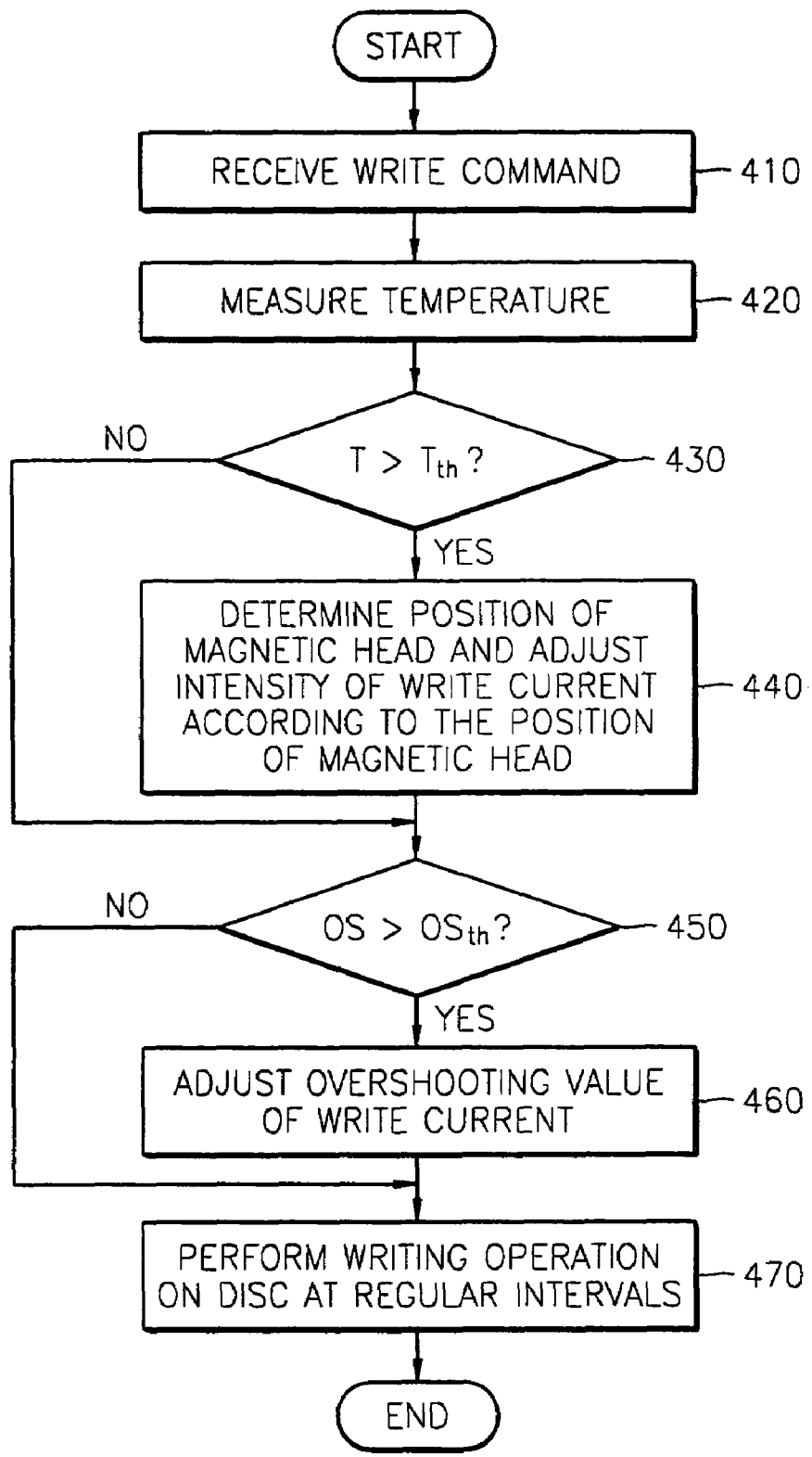
FIG. 4 is a flowchart showing a method of preventing an adjacent track erase effect (ATE) according to an aspect of the present invention.

FIG. 4 is a flowchart showing a method of preventing an ATE effect according to an aspect of the present invention.

When the HDD 100 receives a write command from the host computer, as shown in operation 410, the first buffer memory 143-1 stores data to be written. In operation 420, the temperature sensor 144 senses a temperature T of the HDD 100. In operation 430, it is determined whether the temperature T exceeds the threshold temperature $T_{th}$. If it is determined that temperature T is higher than the threshold temperature $T_{th}$, the position of the magnetic head on an area of a data zone is determined and the intensity of the write current is adjusted according to the position of the magnetic head, in operation 440. Accordingly, if in operation 430, the temperature T exceeds the threshold temperature $T_{th}$, the controller 141 controls the write current so that the steady-state value of the write current is reduced.

On the other hand if in operation 430, the temperature T is less than the threshold temperature $T_{th}$, the steady-state value of the write current is set to the initially determined value and applied to the magnetic head 120. Since an overshooting value OS of the write current as well as the steady-state value of the write current affect a thermal pole tip protrusion (TPTP), in operation 450, it is determined whether the overshooting value OS exceeds a threshold overshooting value $OS_{th}$. Here, the threshold overshooting value $OS^{th}$ is experimentally obtained for each steady-state write current and for each temperature. If in operation 450, the overshooting value OS exceeds the threshold overshooting value $OS^{th}$, the overshooting value OS of the write current is adjusted in operation 460. Various types of dampers, which receive a control signal from the controller 141 to adjust overshooting of a write current, are known. The dampers can adjust the overshooting of the write current by connecting damping resistors to a writing head in parallel and controlling the damping resistors.

In operation 470 after the steady-state value and the overshooting value OS of the write current are adjusted, the write current is applied to the writing head to perform a writing operation. For example, if a N-time writing operation is performed in the data zone of the disc 112, a one-time writing operation is performed M times to write data on the disc N times. Here, N and M are natural numbers, and optimum M can be experimentally obtained.

Figure 5:
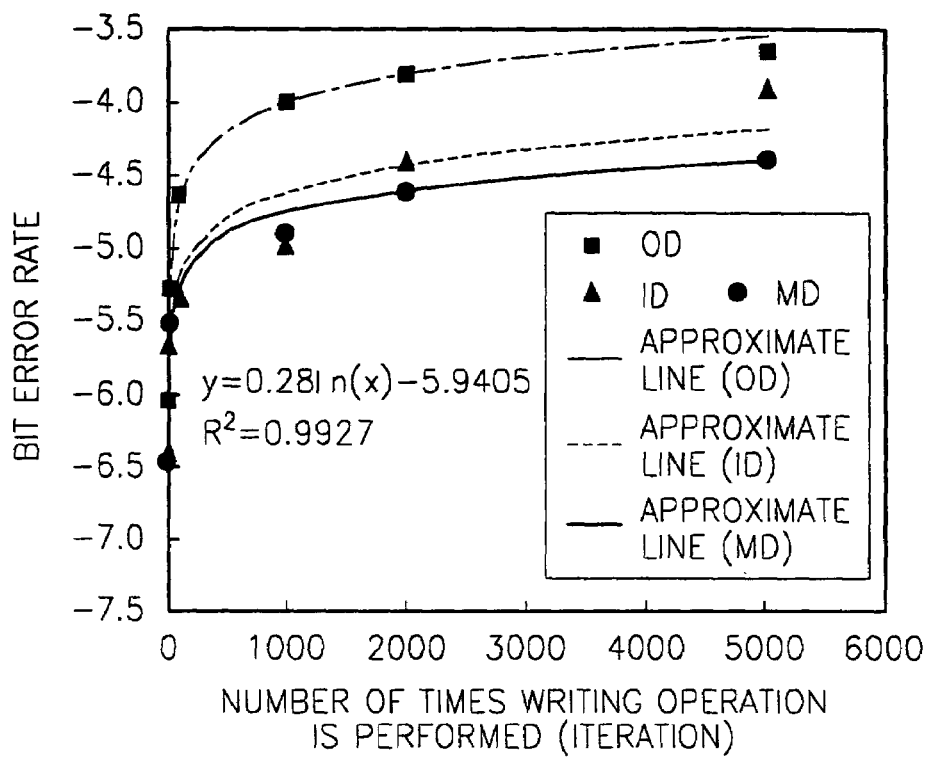
FIG. 5 is a graph illustrating an ATE effect due to the number of times writing is performed according to an aspect of the present invention.

FIG. 5 is a graph illustrating an ATE effect according to the number of times a writing operation is performed on a disc according to an aspect of the present invention.

In order to prevent the ATE effect which causes degradation of on-track data, the ATE effect is optimized in an HDD by increasing a cooling time using a heating effect according to Joule's law which states, $Q=I*I*R*t$ where I is current, R is resistance, and t is time. In FIG. 5, OD, ID, and MD denote an outer disc zone, an inner zone, and a middle disc zone, respectively. Also, in FIG. 5, a bit error rate measured with respect to the number of times a writing operation is repeated is marked with points based on $y=0.28 \ln(x)-5.9405$.

Accordingly, when the magnetic head 120 performs a writing operation onto the disc 112, a write current is applied to a write coil of the magnetic head 120. As a result, heat according to Joule's law is generated, the write coil expands, and the amount of generated heat increases. In other words, the write current depends on time, the cross-sectional area of the coil, and the characteristics of a material of the coil. However, the ATE effect in an HDD depends on the steady-state value of the write current, an overshooting value of the write current, the temperature of the HDD, and geometrical characteristics of a magnetic head.

FIG. 5 illustrates general patterns and characteristics of an ATE effect. As shown in FIG. 5, the ATE effect increases due to the position and an increase in the temperature of the magnetic head, the steady-state value of a write current, an overshooting value of the write current, and the number of times a writing operation is performed. In the present invention, the number of times the writing operation is performed is reduced to decrease the ATE effect in an HDD. Thus, by reducing the amount of generated heat according to Joule's law, a cooling effect can be achieved. In other words, the number of times the writing operation is performed is reduced, thereby limiting thermal pole tip protrusion (TPTP), caused by heat and expansion of the coil of the magnetic head. Also, a cooling sensor system, which transiently minimizes this effect, operates according to an algorithm so that a writing operation is effectively performed.

Figure 6:
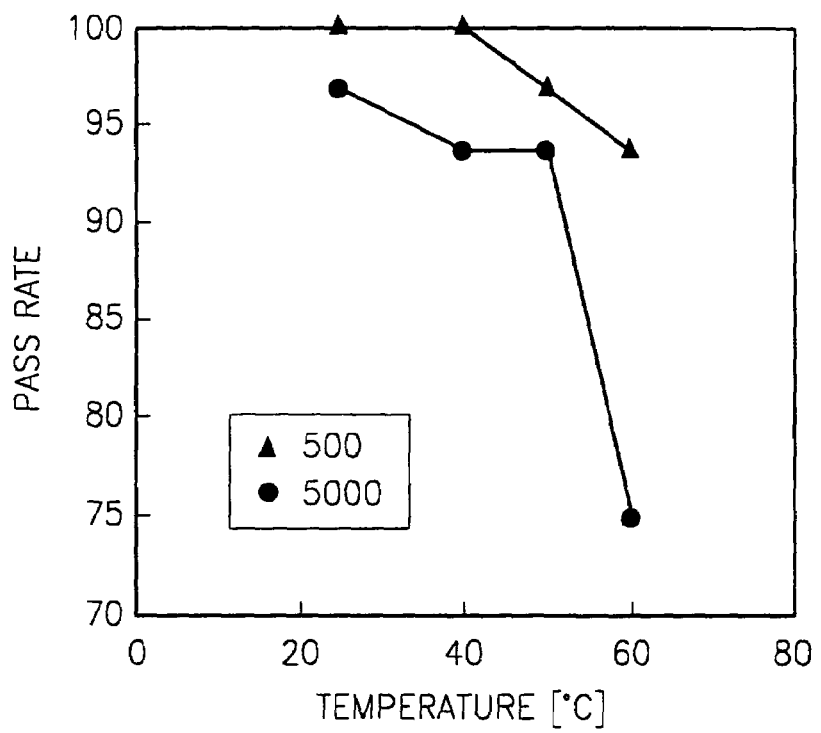
FIG. 6 is a graph illustrating a time to failure (TTF) rate when writing is performed 500 times and when writing is performed 5000 times.

FIG. 6 is a graph illustrating a time to failure (TTF) rate when a writing operation is performed 500 times and 5000 times.

A TTF rate can be improved by counting and comparing percent [%] failure rates under user conditions. The comparison results show when the writing operation is performed 500 times and 5000 times without an optimizing work, a failure rate and a bit error rate due to the ATE effect drop at every temperature. As seen in FIG. 6, points at which the bit error rate is saturated are not much different then when the writing operation is performed 500 times and when the writing operation is performed 5000 times. The total number of times the writing operation is performed is 20,000. However, a threshold point at which local bit corruption occurs due to the ATE effect may vary sharply depending on the number of times the writing operation is performed. As seen in the experimental result, due to the cooling effect, the pass rate of a sample when the writing operation is performed 500 times is about 20% higher than when the writing operation is performed 5000 times.

Accordingly, the failure rate occurring when writing data due to an ATE effect caused by heating a magnetic head according to Joule's law can be reduced. Also, a margin of a bit error rate of a magnetic head/disc can be increased by reducing a steady-state value of a write current and an overshooting value of the write current. In addition, thermal pole tip protrusion can be minimized, the life span of the magnetic head can be prolonged, and a defect rate can be increased.

The present invention can be fashioned as computer-readable codes in computer-readable recording media. The computer-readable media includes all kinds of recording media in which computer-readable data is stored. The computer-readable media include storing media, such as magnetic storing media (e.g., ROMs, floppy discs, hard disc, and the like), optical reading media (e.g., CD-ROMs, DVDs, and the like), and carrier waves (e.g., transmission via the Internet). Also, the computer-readable media can store and execute computer-readable codes that are distributed in computers connected via a network.

Although a few preferred embodiments of the present invention have been shown and described, it would be appreciated by those skilled in the art that changes maybe made in this embodiment without departing from the principles and spirit of the invention, the scope of which is defined in the claims and their equivalents.

What is claimed is:

1. A method of preventing an adjacent track erase effect due to a magnetic head, the method comprising:
   receiving a write command;
   measuring an ambient temperature of a hard disc drive;
   determining whether the ambient temperature exceeds a stored threshold temperature and if the ambient temperature exceeds the threshold temperature, determining a position of the magnetic head and adjusting an intensity of a write current according to the position of the magnetic head;
   determining whether an overshoot value of the write current exceeds a stored threshold overshooting value and if the overshooting value exceeds the stored overshoot value, adjusting the overshooting value of the write current; and applying the adjusted write current intensity and the adjusted overshooting value to the magnetic head.

2. The method of claim 1, wherein the predetermined steady-state value is standardized depending on characteristics of the magnetic head, the ambient temperature of the hard disc drive, and a bit error rate of the hard disc drive.

3. The method of claim 1, wherein an N-time writing operation is repeated M times on the magnetic disc via the magnetic head to which the write current is applied, wherein N and M are natural numbers.

4. A controlling apparatus of a hard disc drive for preventing an adjacent track erase effect, the controlling apparatus comprising:

a temperature sensor that receives a write command and measures an ambient temperature of a hard disc drive;

a controller that controls intensity of a write current and an overshooting value of the write current depending on the sensed ambient temperature of the hard disc drive and the position of the magnetic head; and a write driver that supplies the write current having the adjusted intensity and overshooting value to the magnetic head, wherein the controller repeats an N-time writing operation M times via the magnetic head to which the write current is applied, wherein N and M are natural numbers.

5. A computer-readable recording medium on which a program for executing a method of preventing an adjacent track erase effect is recorded, the method comprising:

receiving a write command;

measuring an ambient temperature of a hard disc drive; and determining whether the ambient temperature exceeds a stored threshold temperature and if the ambient temperature exceeds the stored threshold temperature, determining a position of the magnetic head and adjusting an intensity of a write current according to the position of the magnetic head;

determining whether an overshoot value of the write current exceeds a stored threshold overshooting value and if the overshooting value exceeds the stored overshoot value, adjusting the overshooting value of the write current; and applying the adjusted write current intensity and the adjusted overshooting value to the magnetic head.

6. A hard disc drive controlling apparatus for preventing an adjacent track erase effect, the controlling apparatus comprising:

a controller device receiving a write command from a host computer;

a writing device applying a write current to a magnetic disc head in response to the write command;

a memory device storing a predetermined threshold value and a threshold overshooting value;

a temperature sensor device sensing a temperature of the hard disc drive, wherein if the sensed temperature exceeds the predetermined threshold value, the controller device determines a position of the magnetic disc head and adjusts the intensity of the write current; and wherein if the overshooting value of the write current exceeds the threshold overshooting value, the controller device adjusts the overshooting value of the write current.

7. The apparatus according to claim 6, further comprising a read preamplifier and write driver device, coupled to the controller, for reading and amplifying signals from a disc.

8. The apparatus according to claim 6, further comprising a read/write channel device, coupled to the controller, for reading or writing data from or onto a disk.

9. The apparatus according to claim 6, further comprising a voice coil motor driver supplying a drive current to a voice coil.

10. The apparatus according to claim 6, wherein the controller comprises a microprocessor, a digital signal processor, or a microprocessor.

11. The apparatus according to claim 6, wherein the memory device comprises a ROM, a flash memory, a RAM, or a buffer memory.

12. A computer readable code stored on a computer readable medium for preventing an adjacent track erase effect of a hard disc drive according to a method, the method comprising:

applying a write current to a magnetic disc head in response to a write command from a host computer;

sensing a temperature of the hard disc drive;

determining if the sensed temperature of the hard disc drive exceeds a threshold temperature, wherein if the sensed temperature exceeds the threshold temperature, determining a position of the magnetic disc head and adjusting an intensity of the write current according to the position of the magnetic disc head, and determining if an overshooting value of the write current exceeds a threshold overshooting value, wherein if the overshooting value of the write current exceeds the threshold value, adjusting the overshooting value of the write current.

* * * * *

UNITED STATES PATENT AND TRADEMARK OFFICE
CERTIFICATE OF CORRECTION

PATENT NO. : 6,972,920 B2 Page 1 of 1
APPLICATION NO. : 10/664967
DATED : December 6, 2005
INVENTOR(S) : Dae-il Kim et al.

It is certified that error appears in the above-identified patent and that said Letters Patent is hereby corrected as shown below:

Column 7, line 35, Claim 5, delete "and".

Signed and Sealed this

Fifteenth Day of August, 2006

JON W. DUDAS
*Director of the United States Patent and Trademark Office*